United States Patent
Danninger et al.

(10) Patent No.: US 7,735,022 B2
(45) Date of Patent: Jun. 8, 2010

(54) METHOD OF ENTERING OF DATA INTO A DATA PROCESSING SYSTEM

(75) Inventors: Michael Danninger, Landau (DE);
Georgios Grigoriadis, Mannheim (DE);
Matthias Harbusch, Schoenborn (DE);
Marie-Simone Proksch, Pforzheim (DE); Dagmar Repschlaeger, Wiesloch (DE)

(73) Assignee: SAP AG, Walldorf (DE)

( * ) Notice: Subject to any disclaimer, the term of this patent is extended or adjusted under 35 U.S.C. 154(b) by 862 days.

(21) Appl. No.: 10/933,263

(22) Filed: Sep. 3, 2004

(65) Prior Publication Data
US 2005/0125268 A1    Jun. 9, 2005

(51) Int. Cl.
*G06F 3/048* (2006.01)
(52) U.S. Cl. .................. 715/853; 715/829; 715/835; 715/840; 715/843
(58) Field of Classification Search .............. 715/853, 715/843, 829, 835, 840
See application file for complete search history.

(56) References Cited

U.S. PATENT DOCUMENTS 5,609,770 A * 3/1997 Zimmerman et al. ........ 210/739
6,456,304 B1 * 9/2002 Angiulo et al. ............. 715/779
6,850,941 B1 * 2/2005 White et al. ................ 707/10
2003/0040946 A1 * 2/2003 Sprenger et al. ............ 705/6

FOREIGN PATENT DOCUMENTS

| EP | 1 098 244 A2 | 5/2001 |
| EP | 1 156 415 A2 | 5/2001 |
| WO | WO 91/065050 | 5/1991 |

* cited by examiner

*Primary Examiner*—Steven P Sax
*Assistant Examiner*—Andrey Belousov
(74) *Attorney, Agent, or Firm*—Finnegan, Henderson, Farabow, Garrett & Dunner LLP

(57) ABSTRACT

The present invention relates to a method of entering of data in a data processing system. A first linear sequence of top-level icons is displayed. A second linear sequence of second-level icons for a selected one of the top-level icons is also displayed such that the position of the leading icon of the second linear sequence is aligned with the selected one of the top-level icons of the first linear sequence. At least one data entry field for a selected one of the second-level icons is also displayed.

16 Claims, 19 Drawing Sheets

METHOD OF ENTERING OF DATA INTO A DATA PROCESSING SYSTEM

RELATED APPLICATIONS

Applicants claim the right to priority based on U.S. Provisional Patent Application No. 60/478,461, filed Jun. 13, 2003, and PCT Application No. PCT/EP03/13650, filed Dec. 3, 2003.

FIELD OF THE INVENTION

The present invention relates to the field of data processing, and more particularly without limitation to entering of data into a data processing system.

BACKGROUND OF THE INVENTION

There are various situations where a user needs to manually enter data. Examples include installing an application program, entering of user settings, adding a hardware component to a computer system, or adding a network component to a telecommunications system. Often a user needs to perform repetitive sets of data input operations in a certain sequence to arrive at a desired outcome.

Wizards help users perform complex tasks by guiding the user in a step by step fashion. For example, wizards have been added to software applications to help users configure peripherals such as modems and printers. Such a wizard guides the user through each step, such as selecting installation options, selecting ports, installing necessary software drivers, creating necessary links to other applications, and setting any other necessary parameters.

Typically, the wizard attempts to guide the user as much as possible. For example, instead of forcing the user to type in a cryptic and hard to remember parameter, the wizard provides a list of potentially acceptable parameters. As another example, the wizard may only provide as options those parameters that do not conflict with other applications and/or devices. In such a way, the wizard guides the user through the otherwise difficult process.

Wizards thus provide an improved user interface that allows users with less technical sophistication to efficiently configure and use their computer. Unfortunately, the widespread adoption of wizards in software applications has been limited by the time and difficulty involved in creating them.

U.S. Pat. No. 6,307,925 shows the use of wizards in a PBX environment. Telecommunication equipment is connected to and controlled by a computer which executes software controlling the digital communication between the telecommunication equipment and the computer. Software in the form of a wizard also executes on the computer and acts to simplify the computer user's interaction with the telecommunication equipment and underlying software which controls the telecommunication equipment.

U.S. Pat. No. 6,307,544 shows a method for delivering a dynamic context sensitive integrated user assistance solution. Dynamic assistance is provided to a user of a computer system by means of a navigation model that integrates help information, task guide information, interactive wizard information into a single user assistance system. Code for the user assistance system is maintained separately from code for an application program for the computer system.

The present invention aims to provide an improved method of entering of data in a data processing system.

SUMMARY OF THE INVENTION

The present invention provides for a method of entering of data in a data processing system by displaying a first linear sequence of top-level icons. At least one of the top-level icons has assigned one or more second linear sequences that are represented by respective second-level icons. When one of the second-linear sequences is displayed it is aligned with the top-level icon of the first linear sequence to which it is assigned. By means of one or more data entry fields that are displayed together with a selected one of the second-level icons a user can conveniently enter data.

The present invention is particularly advantageous as the user is guided through various data entry steps in an intuitive, easy to understand and convenient way. This reduces the interaction time with the data processing system in order to complete a given data entry task in a convenient and intuitive way.

The data entry method of the present invention can be used for various applications including installation of application programs, installation and/or configuration of computer hardware, installation and/or configuration of telecommunication network components, or entering of data for a business task, such as making reservations for a trip, entering of expenses, business reporting or any other more or less complex data entry or data manipulation task.

In accordance with a preferred embodiment of the invention the first and second linear sequences are orientated horizontally. Preferably both the top-level icons and the second-level icons are interconnected by respective horizontal lines for visualisation of the first and second linear sequences.

In accordance with a further preferred embodiment of the invention, a set of navigation buttons is displayed. By means of the navigation buttons a user can navigate along the first linear sequence and/or the second linear sequences.

In accordance with a further preferred embodiment of the invention, a top-level icon of the first linear sequence has assigned two or more alternative second linear sequences. When the top-level icon with the multiple second linear sequences is selected, selection buttons for selection of one of the second linear sequences assigned to the top-level icon are displayed. This way a user can select one of the second linear sequences.

In accordance with a further preferred embodiment of the invention, the user can select the same or another one of the second linear sequences assigned to the same top-level icon for performing another data entry task after a preceding data entry task has been completed.

In accordance with a further preferred embodiment of the invention the display of a second linear sequence is discontinued after the corresponding data entry sub-task has been completed by the user.

In accordance with a further preferred embodiment of the invention a selected top-level and/or second-level icon is highlighted in order to visualise the present status of an ongoing data entry task or data entry sub-task.

In accordance with a further preferred embodiment of the invention only a portion of the first linear sequence and/or the second linear sequence is displayed in the display window. This is particularly advantageous for applications involving many steps. Preferably the portion of the first and/or second linear sequence consists of an uneven number of icons. The middle icon of the portion of the sequence is positioned in the middle of the display window. By means of a corresponding navigation button a user can go from one portion of the sequence to the next.

It is to be noted that the present invention can be implemented as an improved wizard that visualizes a "road map" of data entry tasks, sub-tasks and steps to perform a certain data entry procedure.

BRIEF DESCRIPTION OF THE DRAWINGS

In the following preferred embodiments of the invention will be described in greater detail by making reference to the drawings in which:

FIG. 7 shows a window with a top-level linear sequence after selection of a data entry task from the window of FIG. 6;

Figure 9:
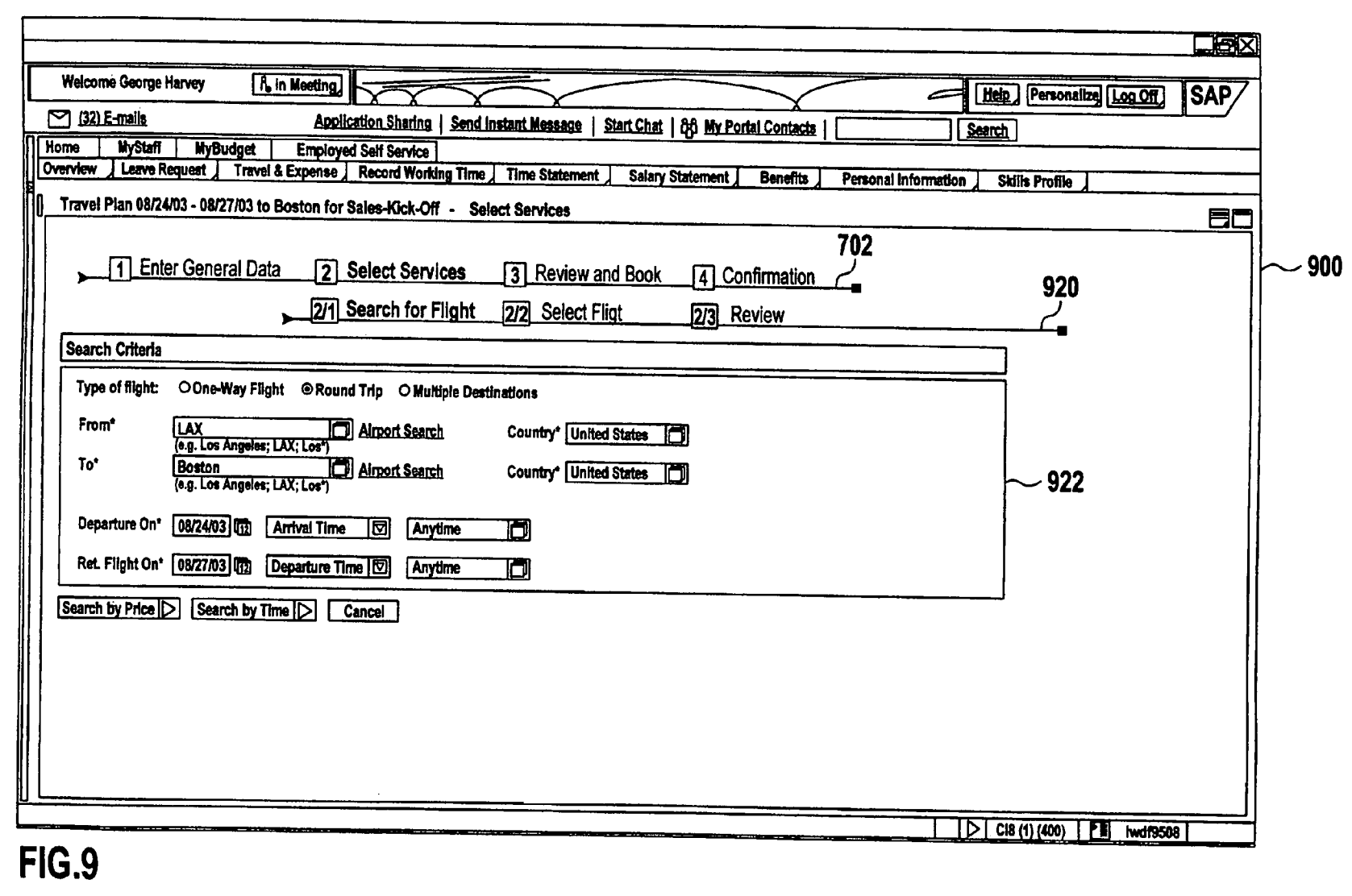

FIG. 9 shows the window of FIG. 8 after selection "add flight";

FIG. 10 shows the window of FIG. 9 when second-level icon "select flight" in the second-level linear sequence is active;

FIG. 11 shows the window when second-level icon "review" is active in the second-level linear sequence;

FIG. 14 shows the corresponding window 1400 when the next second-level icon in linear sequence 1320 is selected;

FIG. 16 shows the window after the task "add hotel" has been completed;

Figure 17:
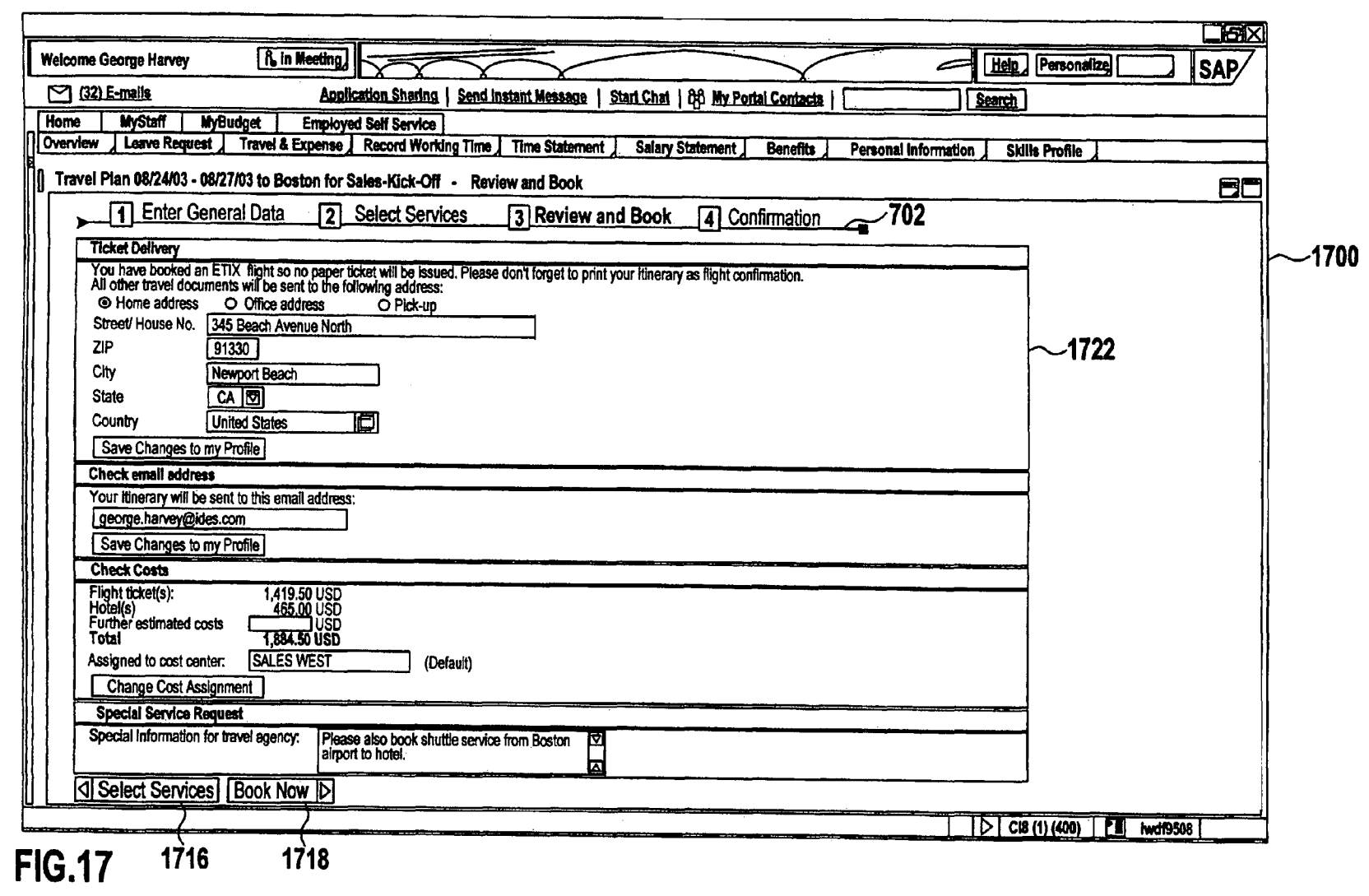

FIG. 17 shows the window when the top-level icon "review and book" is selected;

FIG. 19 shows the updated data entry task selection window of FIG. 6.

DESCRIPTION OF THE EMBODIMENTS

Figure 1:
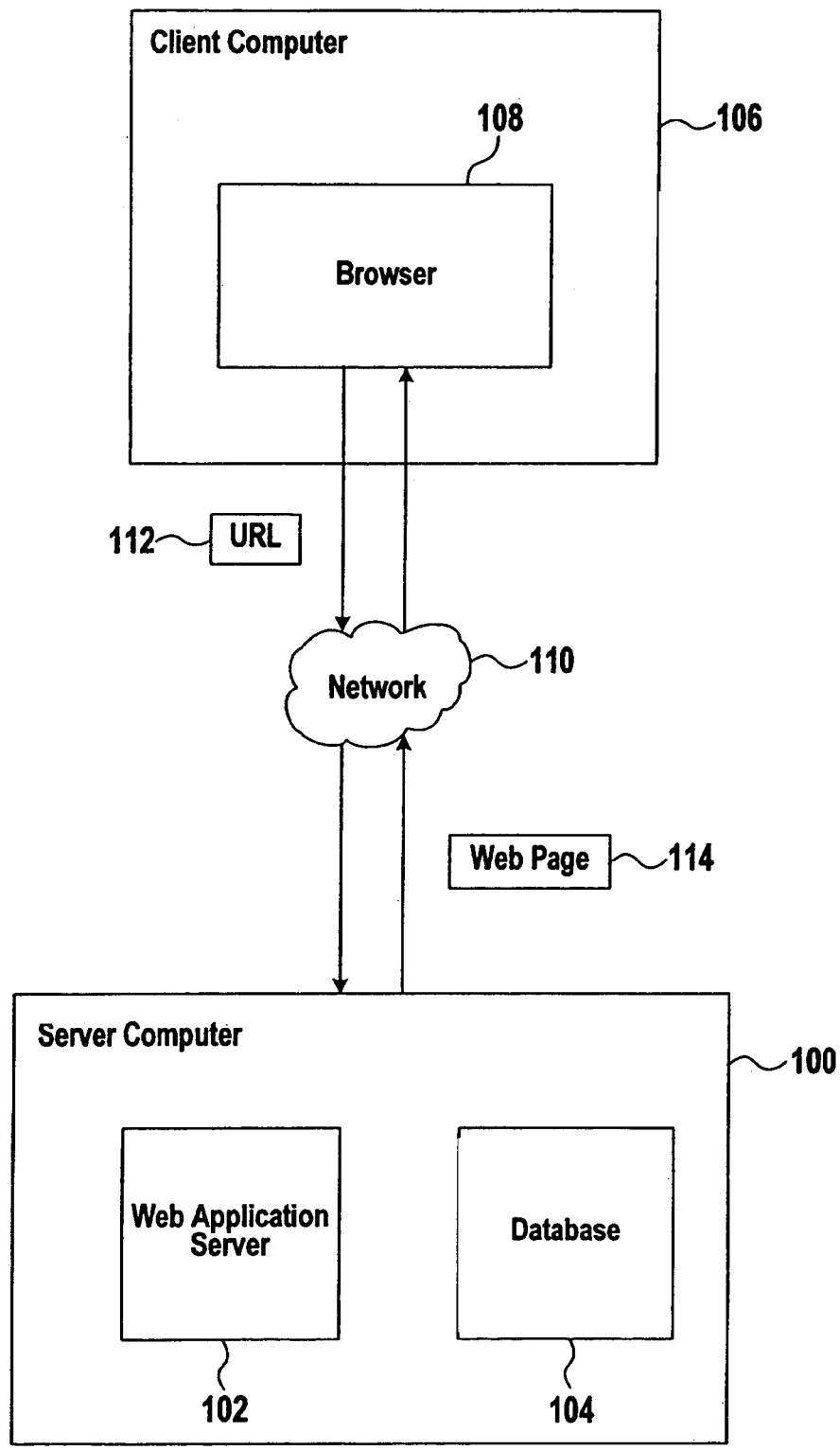
FIG. 1 is a block diagram of a preferred embodiment of a computer system of the invention.

FIG. 1 shows server computer 100 that has web application server program 102. For example, SAP web application server that is commercially available from SAP AG is used as program 102. SAP web application server provides the option of implementing both server-side as well as client-side applications. SAP web application server supports the HTTP, HTTPS, and SMTP protocols.

Web application server program 102 can generate web pages that contain both static HTML and dynamic script code. Preferably ABAP and Java script are supported by web application server program 102.

Further server computer 100 has database 104. Alternatively database 104 is implemented on another computer system to which server computer 100 is coupled.

Client computer 106 has browser program 108, such as Netscape Navigator or Microsoft Internet Explorer. Client computer 106 can be coupled to server computer 100 via network 110, such as the Internet.

Figure 2:
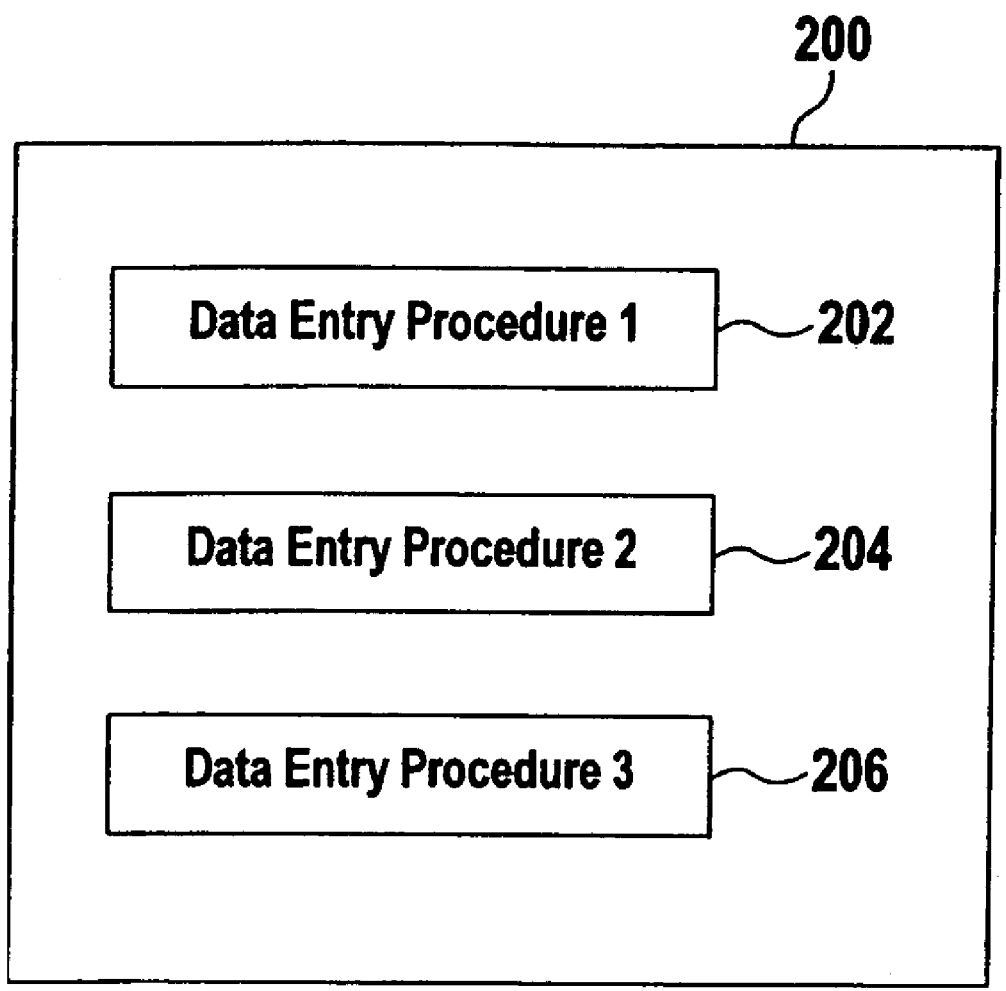
FIG. 2 shows an exemplary window for a user's selection of a data entry task.

In operation a HTTP request 112 is transmitted from browser program 108 to server computer 100. Request 112 contains a uniform resource locator (URL). In response to request 112 web application server program 102 generates web page 114 that is sent back to client computer 106. Web page 114 contains a selection window for selection of a data entry task. FIG. 2 shows an example of such a selection window.

Selection window 200 has virtual selection buttons 202, 204, and 206. By clicking selection button 202, a user can select data entry task 1 whereas, by clicking selection button 204 or 206, a user can select data entry task 2 or data entry task 3, respectively. After selection of one of the data entry tasks from selection window 200, a user is guided through the data entry task by means of a first linear sequence of top-level icons and one or more second linear sequences of second-level icons.

Figure 3:
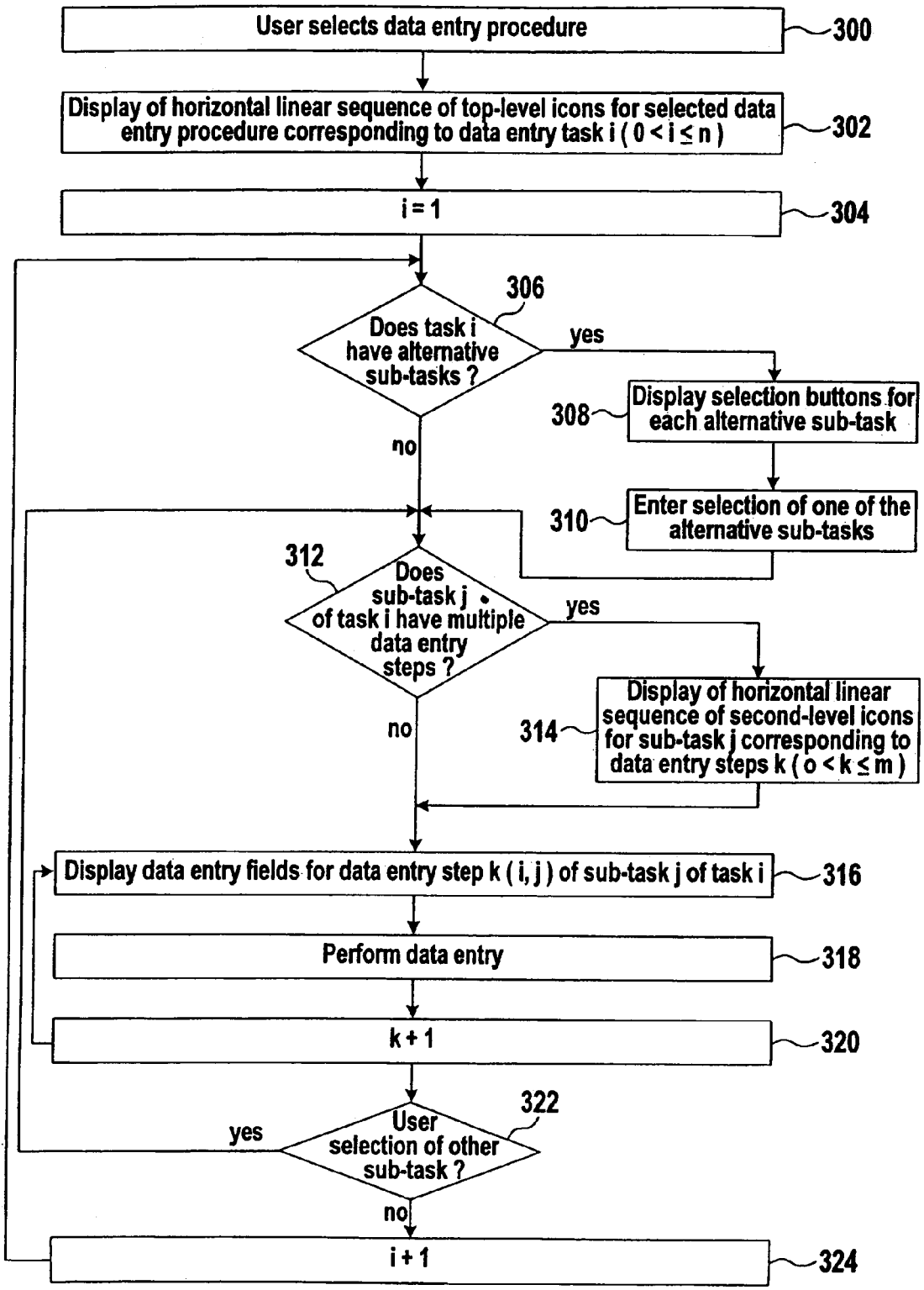
FIG. 3 shows a flow chart of a preferred embodiment of the invention for performing a data entry and/or data manipulation task.

FIG. 3 illustrates the corresponding procedure. In step 300 a user selects a data entry procedure. This can be done by clicking on one of the selection buttons of the selection window (cf. page 2). In response to a user's selection of one of the data entry procedures, a corresponding horizontal linear sequence of top-level icons is displayed in step 302. The linear sequence has a number of n top-level icons corresponding to data entry tasks i, where $0<i\leq n$.

In step 304 the task index i is set to 1. In other words, the leading top-level icon of the horizontal linear sequence becomes active.

In step 306 it is checked whether task 1, as is represented by the activated top-level icon, has two or more assigned alternative sub-tasks. If this is the, case a selection button for each one of the alternative sub-tasks is displayed in step 308. Next, a user selects one of the alternative sub-tasks by clicking on the corresponding selection button in step 310. From there the control goes to step 312.

If there are no alternative sub-tasks of task 1, the control goes directly to step 312. In step 312 it is determined whether the sub-task j of the task i has multiple data entry steps. If this is the case, a linear sequence of second-level icons representing the sub-task j with the multiple data entry steps is displayed.

The linear sequence has a number of m icons corresponding to a number of m data entry steps k, where $0<k\leq m$. The horizontal linear sequence displayed in step 314 is positioned such that its leading icon is aligned with the top-level icon that represents task i.

From step 314 the control goes to step 316. Alternatively, if sub-task j does only have a single data entry step, or if task i is the same as sub-task j and only has a single data entry step, the control goes directly to step 316. In step 316 one or more data entry fields are displayed for entry of data in data entry step k (i, j). In step 318 a user can perform the data entry by means of the at least one data entry field of step 316. In step 320 index k is incremented in order to go to the next data entry step of the linear sequence of second-level icons. From there the control goes back to step 316. Step 316, 318 and 320 are carried out until all m data entry steps of sub-task j of task i have been completed.

After completion of all m data entry steps of sub-task j of task i it is determined in step 322 whether the user has entered a selection of another sub-task j of the same task i. If this is the case the control goes back to step 312 for carrying out the one or more data entry steps of the newly selected sub-task j of task i. If the contrary is the case the control goes to step 324 in order to increment i. This means that the task as represented by the consecutive top-level icon is performed next and the control goes back to step 306. This procedure is continued until the last data entry task n of the linear sequence of top-level icons has been completed.

It is to be noted that the procedure of FIG. 3 can be implemented by means of a request-response protocol, such as the HTTP protocol. In this instance web pages are generated by the web application server (cf. web application server program 102 of FIG. 1) and transmitted to the client computer 106 where the web pages are visualised by means of browser program 108. Data entries made by the user of client computer 106 are communicated back to server computer 100 by means of the HTTP protocol for storage in database 104.

Alternatively the procedure of FIG. 3 can be carried out on a single computer, such as a personal computer, that is or is not connected to a network.

Figure 4:
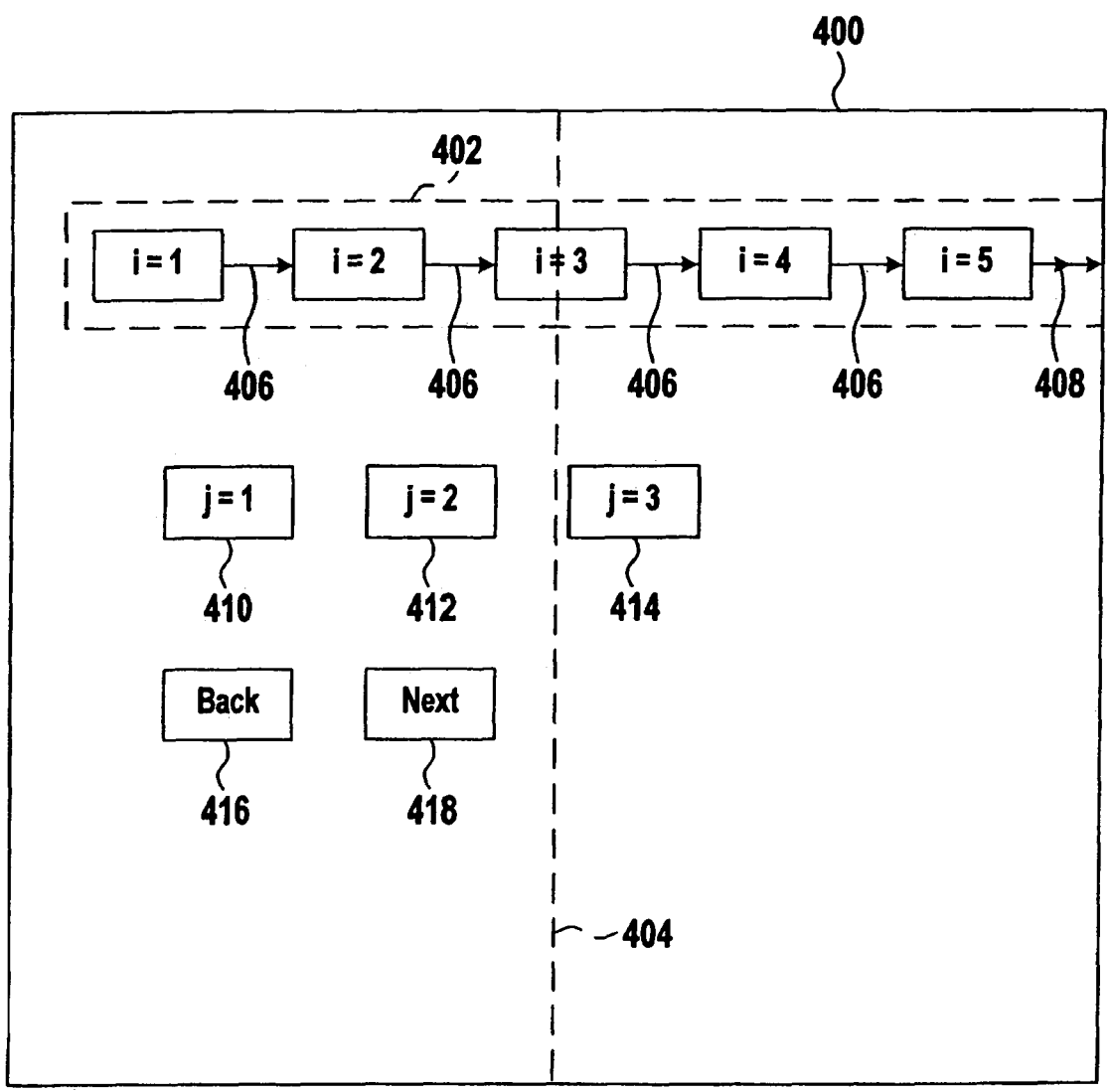
FIG. 4 shows a display window with a portion of a top-level sequence.

FIG. 4 shows window 400 with a portion of linear sequence 402 of top-level icons i. In the example considered here a front portion of the linear sequence 402 with top-level icons i=1 to i=5 are displayed. Icon i=3 which is the middle icon of the displayed portion of linear sequence 402 is positioned on centre line 404 of window 400.

The top-level icons i=1 to i=5 are connected by arrows 406; the last top-level icon i=5 of the displayed portion of linear sequence 402 is connected to double-headed arrow 408. By clicking on double-headed arrow 408 a user can go from one portion of linear sequence 402 to the next. For example when a user clicks on double-headed arrow 408 the consecutive five top-level icons of linear sequence 402 are displayed in window 400. By clicking on double-headed arrow 408 several times a user can navigate through linear sequence 402 by jumping from one portion of linear sequence 402 to the next. In the preferred embodiment considered here, each portion has five consecutive top-level icons and the middle icon of the portion of sequence 402 is always positioned on centre line 404.

Initially top-level icon i=1 of linear sequence 402 is highlighted as this is the leading icon of linear sequence 402. In the example considered here top-level icon i =1 has three alternative sub-tasks j=1, j=2, j=3 that are represented by corresponding selection buttons 410, 412, and 414. Further, navigation buttons 416 and 418 are shown in window 400. Navigation button 416 serves to go backwards starting from the selected icon and navigation button 418 serves to go forwards starting from the selected icon.

Figure 5:
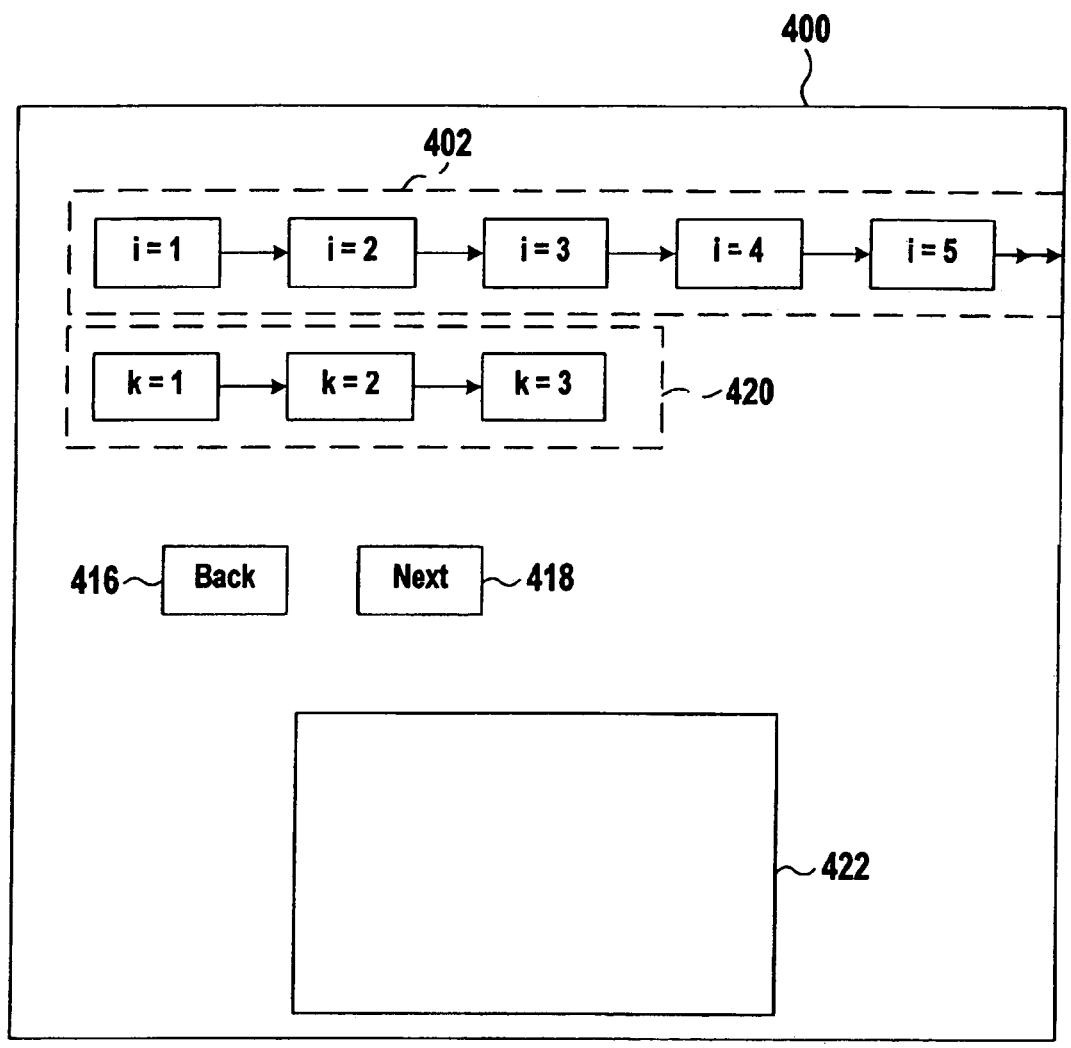
FIG. 5 shows the window of FIG. 4 with a second-level linear sequence.

FIG. 5 shows window 400 after selection of one of the sub-tasks, i.e. after a user has clicked on one of the selection buttons 410, 412 or 414. Without restriction of generality it is assumed that the user has clicked on selection button 410 corresponding to sub-task j=1. Sub-task j=1 has data entry steps k=1 to k=3. These data entry steps are represented by corresponding second-level icons k=1 to k=3 of linear sequence 420.

The leading icon k=1 of linear sequence 420 is vertically aligned with leading icon i=1 of linear sequence 402 as this is the top-level icon to which linear sequence 420 is assigned. It is to be noted that the display of the selection buttons 410 to 414 disappears after the selection of one of the sub-tasks has been performed.

Initially the leading second-level icon k=1 of linear sequence 420 is selected as this is where the data entry procedure of linear sequence 420 starts. By clicking on navigation buttons 416 and 418 a user can navigate along linear sequence 420 and along linear sequence 402. When the second-level icon k=1 is the selected icon the user can go to consecutive second-level icons of linear sequence 420 by clicking on navigation button 418. When the user clicks on navigation button 416 when second-level icon k=1 is the selected icon top-level icon i=1 to which linear sequence 420 is assigned becomes the selected icon. By clicking on navigation button 418 a user can select another top-level icon within linear sequence 402.

In the example considered in FIG. 5, second-level icon k=1 of linear sequence 420 is the selected icon. Data entry window 422 has one or more data fields for viewing and/or entering and/or modifying of data in order to perform data entry step k=1 of sub-task j=1 of task i=1. After completion of this data entry step, the next consecutive item k=2 of linear sequence 420 becomes the selected icon and a corresponding data entry window is shown for that second-level icon, etc.

When all data entry steps of linear sequence 420 have been completed, linear sequence 420 disappears and the next top-level icon of linear sequence 402, i.e. icon i=2, is selected. This icon may or may not have multiple sub-tasks assigned to it. If there are no alternative sub-tasks, the data entry window is shown without the intermediate step for selection of one of the alternative sub-tasks.

Figure 6:
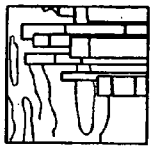
FIG. 6 shows a more detailed embodiment of a window for selecting a data entry task.

FIGS. 6 to 19 show a more detailed preferred embodiment. Window 600 of FIG. 6 shows a travel start page for entering of travel planning data. Various travel data entry tasks can be selected from window 600, such as creation of a new travel plan by online booking of flight, hotel and/or car rental reservations. Alternatively, a travel expense data entry task can be selected or a weekly expense report data entry task. This is done by clicking on one of the hyperlinks 602, 604 or 606, respectively.

Figure 7:
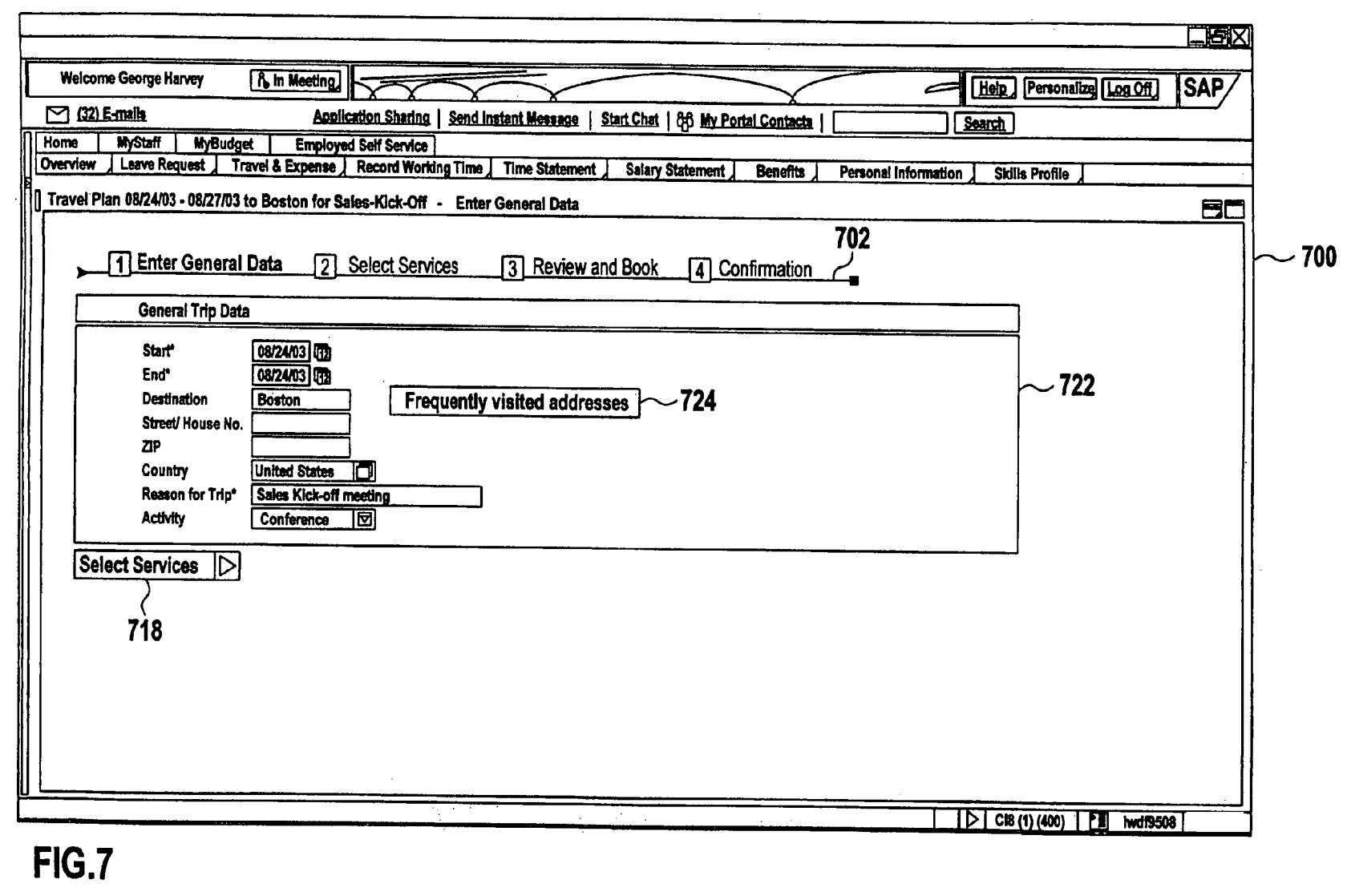

FIG. 7 shows window 700 that is displayed when the user clicks on hyperlink 602. Window 700 shows linear sequence 702 consisting of icons 'enter general data' (i=1), 'selected service' (i=2), 'review and book' (i=3), and 'confirmation' (i=4).

Initially top-level icon 'enter general data' is selected as this is the leading icon of linear sequence 702. As top-level icon 'enter general data' has no alternative sub-tasks assigned to it data entry window 722 opens. Data entry window 722 serves to enter general trip data, such as start and end dates of the trip, trip destination, destination country, reason for making the trip and kind of planned activity. By clicking on button 724, a user can retrieve addresses that have been previously entered in order to facilitate entry of the trip destination. By clicking on navigation button 718, the user can go to the next top-level icon 'selected services' after having completed entry of the trip destination data into data entry window 722.

Figure 8:
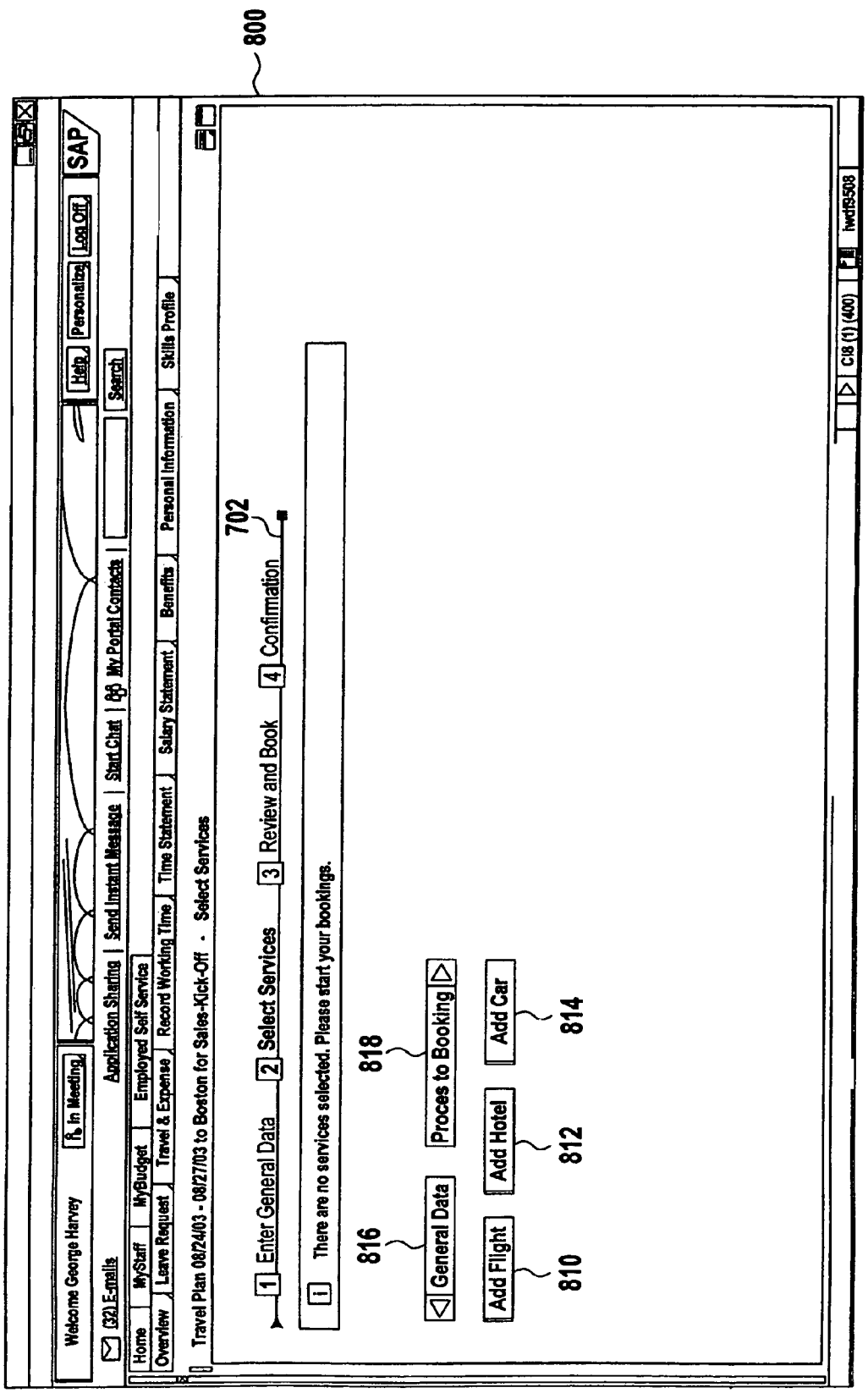
FIG. 8 shows the window of FIG. 7 with the selected top-level icon "select services"

FIG. 8 shows window 800 that is generated after task i=1, i.e. 'enter general data', has been completed. Top-level icon 'select services' is selected in linear sequence 702 as this is the next top-level icon after 'enter general data'. Data entry task 'select services' has three different assigned sub-task, i.e. 'add flight', 'add hotel' and 'add car' for adding a flight, hotel, or car reservation, respectively to the trip plan.

Corresponding selection buttons 810, 812, and 814 are displayed in window 800. Further navigation buttons 816 and 818 are displayed in window 800. When the user clicks on navigation button 816 top-level icon 'select services' is deselected and top-level icon 'enter general data' is selected again such that the user can view and modify the previously entered general trip data. When the user clicks on navigation button 818, top-level 'select services' is deselected and the consecutive top-level icon 'review and book' is selected.

In order to perform the 'select services' data entry task, the user selects one of the sub-tasks that are assigned to the 'select services' data entry task by clicking on one of the selection buttons 810, 812, and/or 814. In the example considered her the user clicks on selection button 810. In response window 900 is generated.

Window 900 shows linear sequence 920 that has second-level icons '2.1 search for flight' (k=1), '2.2 select flight' (k=2), and '2.3 review' (k=3). The leading second-level icon '2.1 search for flight' of linear sequence 920 is vertically aligned with the top-level icon 'select services' to which linear sequence 920 is assigned. This way the logical relationship between top-level icon 'select services' and linear sequence 920 is intuitively understood by the user.

Further window 900 shows data entry window 922 that has a number of data entry fields for entering of search criteria for the flight, such as airport of departure, destination airport departure time and return time. Further various search options for searching a flight are provided to the user ('search by price' or 'search by time'). After the user has completed data entry in data entry window 922 and has pressed the return button on the keyboard, second-level icon '2.2 select flight' is selected.

Figure 10:
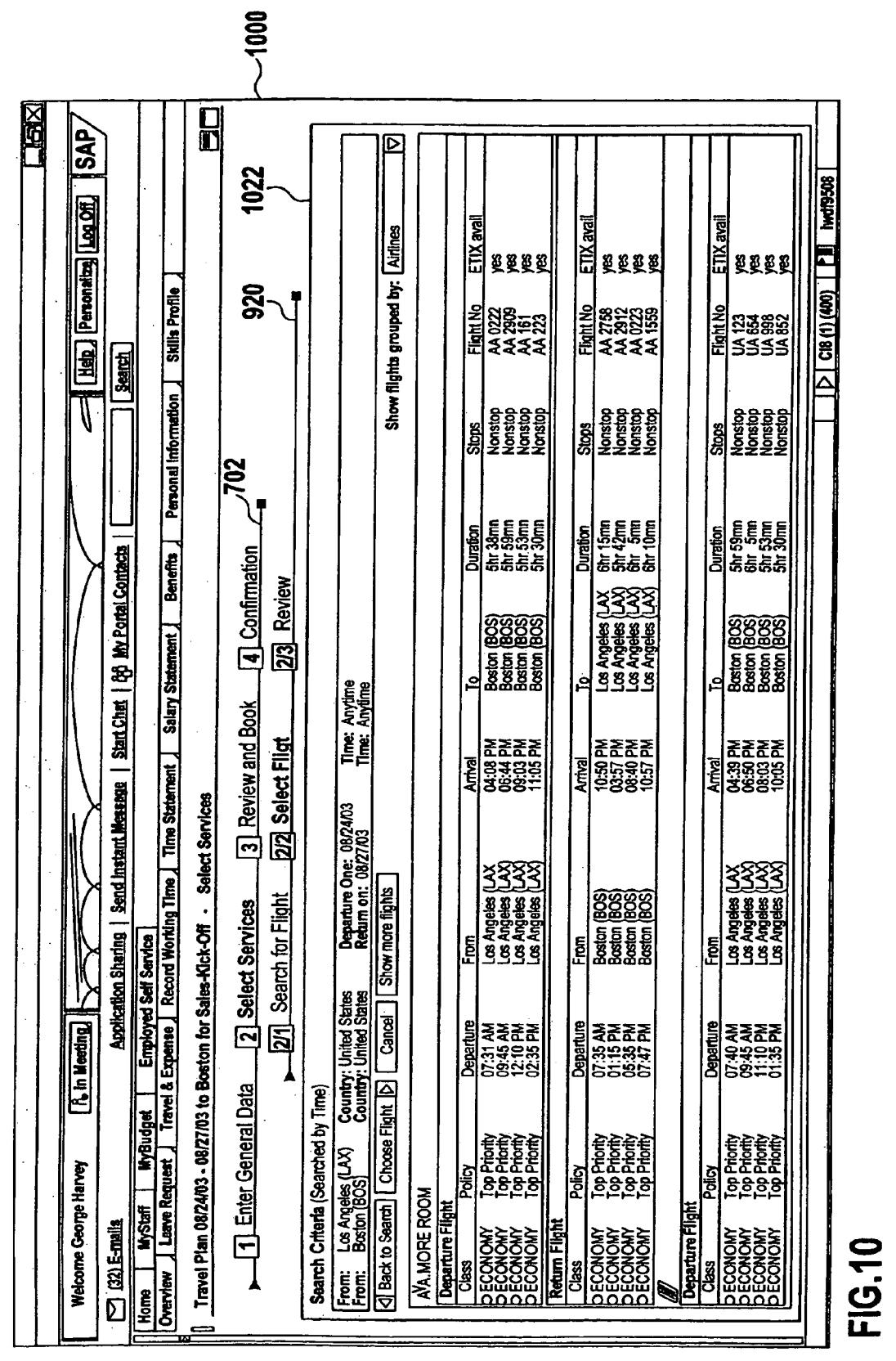

FIG. 10 shows the corresponding window 1000. Window 1000 has data entry window 1022 that shows the various flights that match the search profile that has been entered in the previous data entry window 922 (cf.9). By clicking on one of the flights shown in data entry window 1022 the user can enter his or hers selection of the flight.

Figure 11:
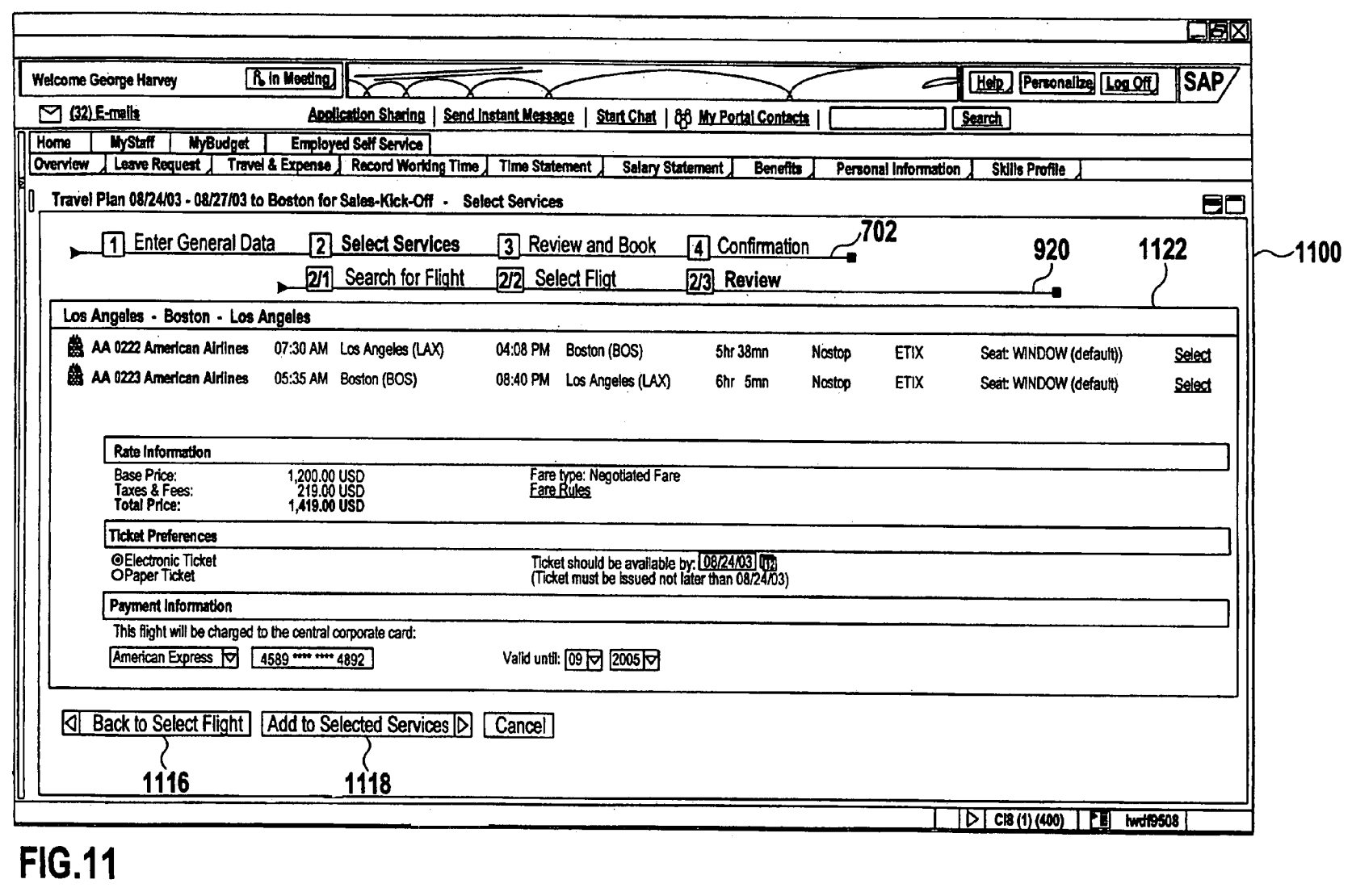

In response window 1200 is generated as shown in FIG. 11. In FIG. 11 second level icon '2.3 review' becomes the active icon and is highlighted. Review window 1122 shows the selected flight and enables a user to enter data for seat selection by clicking on 'select' and to enter ticket preferences, i.e. whether the user prefers an electronic ticket or a paper ticket. Further, review window 1122 enables to modify any payment information.

By clicking on navigation button 1116 'back to select flight', a user can deselect second-level icon '2.3 review' in order to select second-level icon '2.2 select flight' in order to go back to window 1000 as shown in FIG. 10. When the user is satisfied with the content of review window 1122, he or she will click on navigation button 1118 'add to selected services' in order to complete and terminate linear sequence 920. In response, window 1200 is generated that is similar to window 800 of FIG. 8. In addition to window 800, window 1200 shows the services that have been selected so far in window 1222. When the user clicks on selection button 812, window 1300 is generated.

Figure 13:
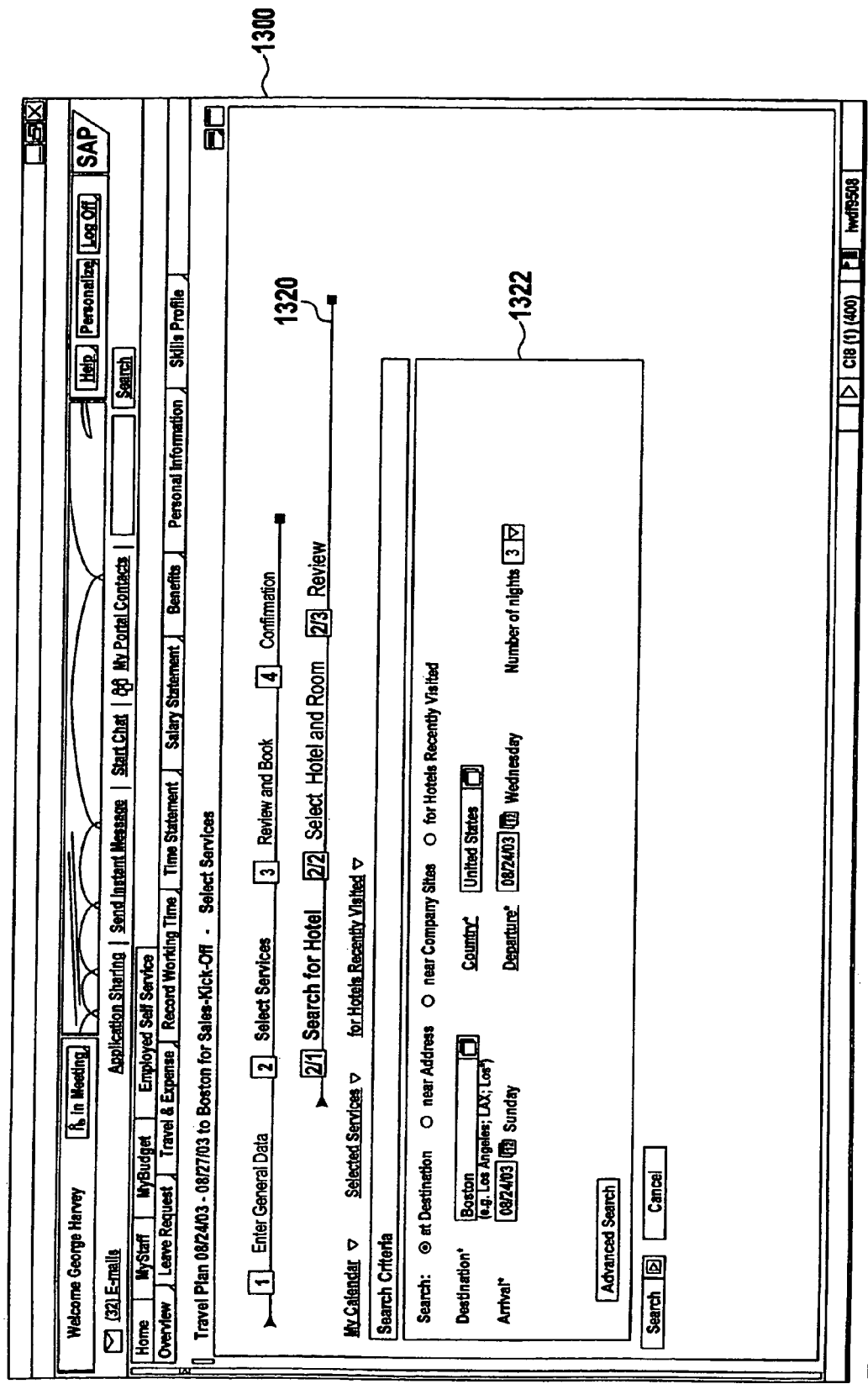
FIG. 13 shows window 1300 that shows linear sequence 1320 of second-level icons that represent the data entry steps to perform the sub-task 'add hotel'.

FIG. 13 shows window 1300 that shows linear sequence 1320 of second-level icons that represent the data entry steps to perform the sub-task 'add hotel'. These are the second-level icons '2.1 search for hotel' (k=1), '2.2 select hotel and room' (k=2), and '2.3 review' (k=3). Initially, the leading icon of linear sequence 1320, i.e. second-level icon '2.1 search for hotel' is selected and data entry window 1322 is shown for entering the search profile for the hotel search. Data entry window 1322 has data entry fields for entering of the trip destination, the planned arrival and departure times and the number of nights. By clicking on button 'search', the database query is performed and the next second-level icon in linear sequence 1320 is selected.

Figure 14:
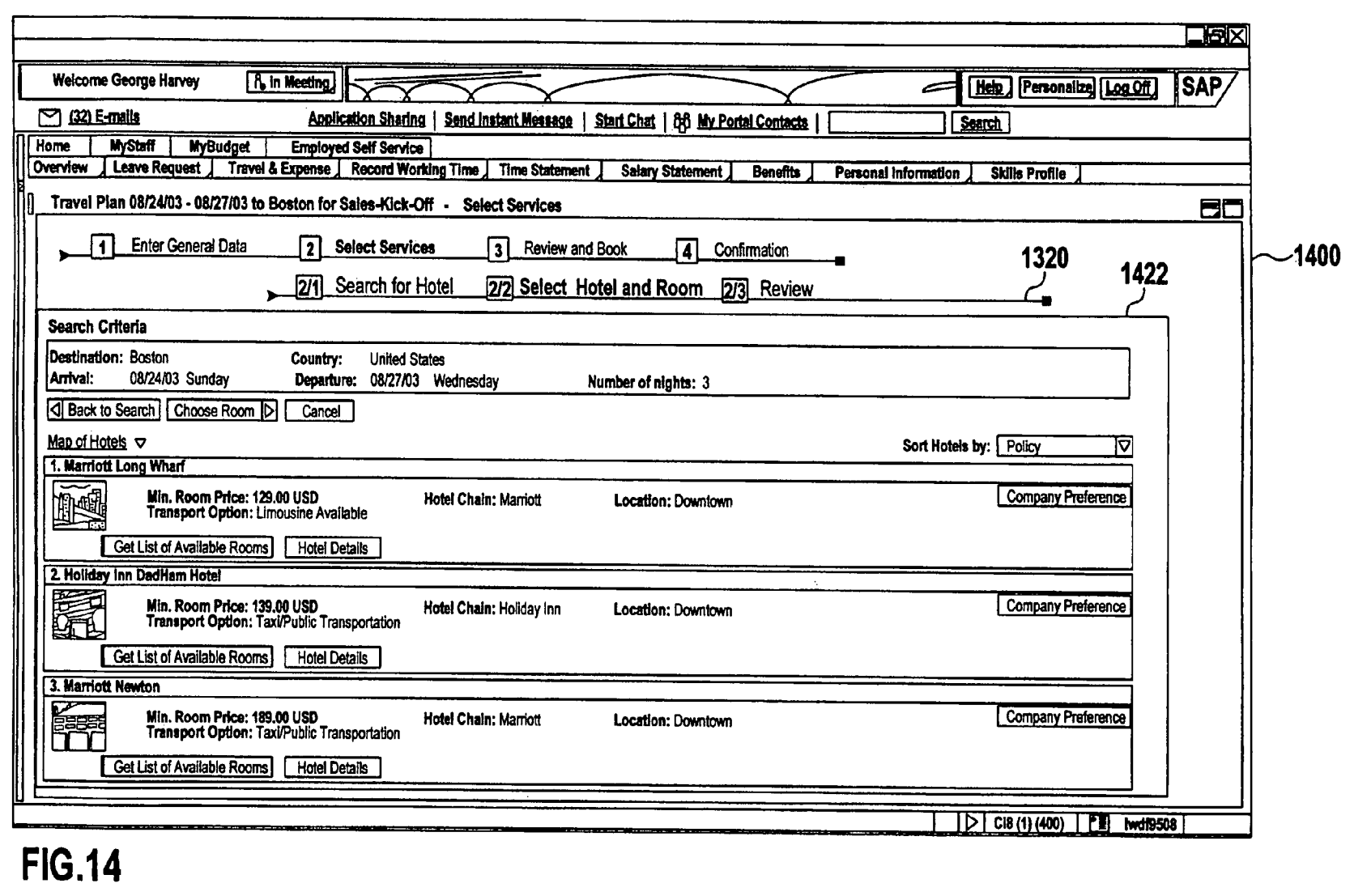

FIG. 14 shows the corresponding window 1400. Window 1400 shows linear sequence 1320 with the highlighted second-level icon '2.2 select hotel and room'. Data entry window 1422 shows the result of the hotel search in accordance with the search profile entered in the previous window 1300. The user can select a hotel and a hotel room from the list of hits shown at the data entry window 1422.

Figure 15:
FIG. 15 shows the window resulting when the user selects a hotel and a hotel room from the list of hits shown at the data entry window 1422.

FIG. 15 shows the resulting window 1500. In window 1500, sub-icon '2.3 review' is highlighted and data entry window 1522 shows the previously selected hotel and room reservations. The user can enter additional preferences into data entry window 1522 such as non-smoking, preferred room category and payment information.

When the user is satisfied with the data that is shown in data entry window 1522, he or she clicks on navigation button 1518 in order to complete the sub-task as represented by linear sequence 1320, i.e. adding a hotel to the selected services. The result is shown in window 1600 or FIG. 16.

Figure 12:
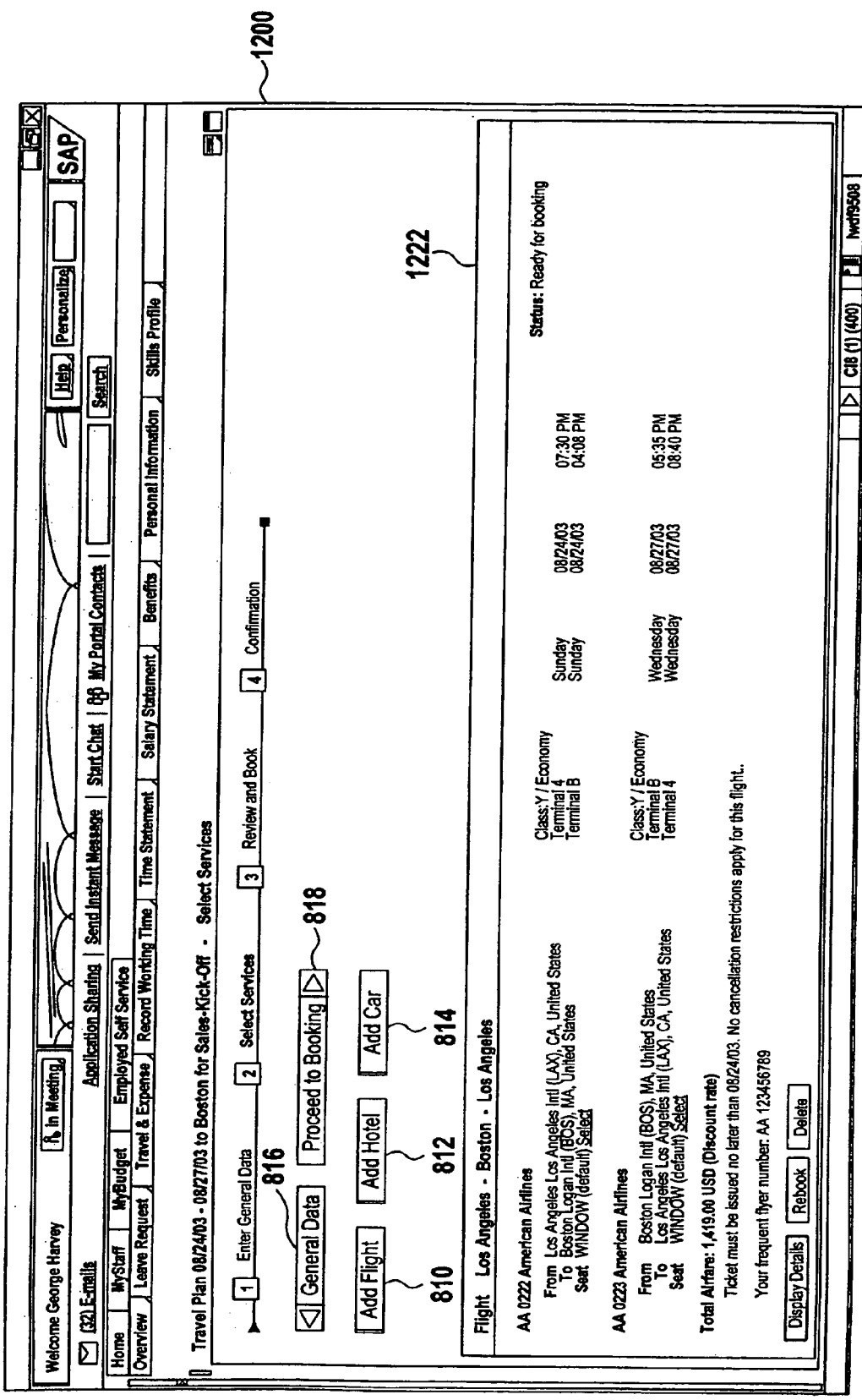
FIG. 12 show the corresponding windows for the data entry sub-task "add hotel"
Figure 16:
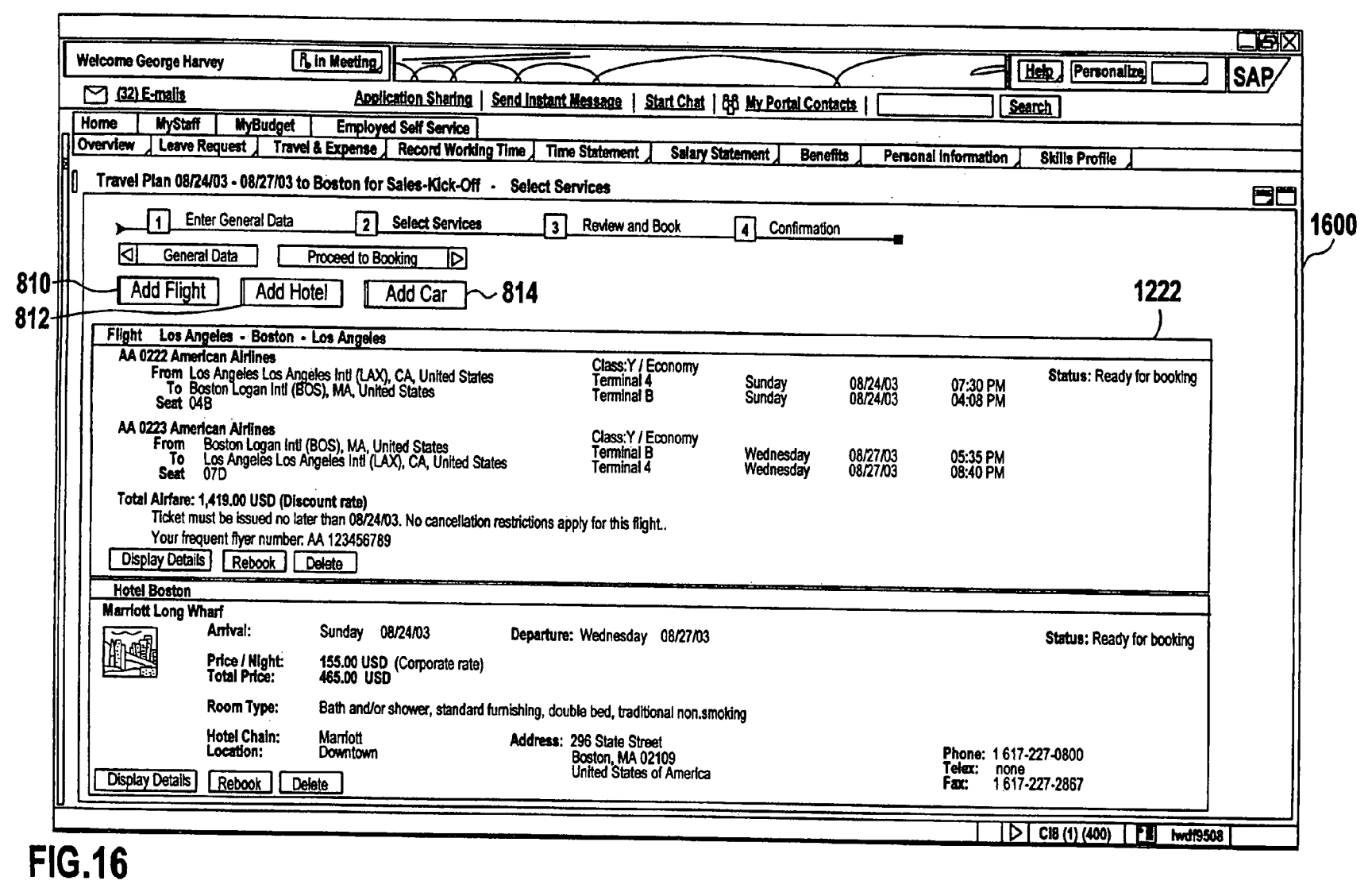

FIG. 16 corresponds to FIG. 12. In addition to window 1200 of FIG. 12, window 1600 of FIG. 16 shows the hotel and room reservation. Next the user can click on the selection button 814 in order to select the sub-task 'add car'. This will invoke display of a corresponding linear sequence that is assigned to this sub-task of 'select services', similar to FIGS. 9 to 11 and FIGS. 13 to 15.

After completion of the sub-task 'add car' of 'select services' window 1700 is generated. Window 1700 shows linear sequence 702 with top-level icon 'review and book' highlighted. Further data entry window 1022 shows a data field for entering ticket delivery details, cost information and a window for special service requests. By clicking on navigation button 1718 the user can finalise the booking of the trip.

Figure 18:
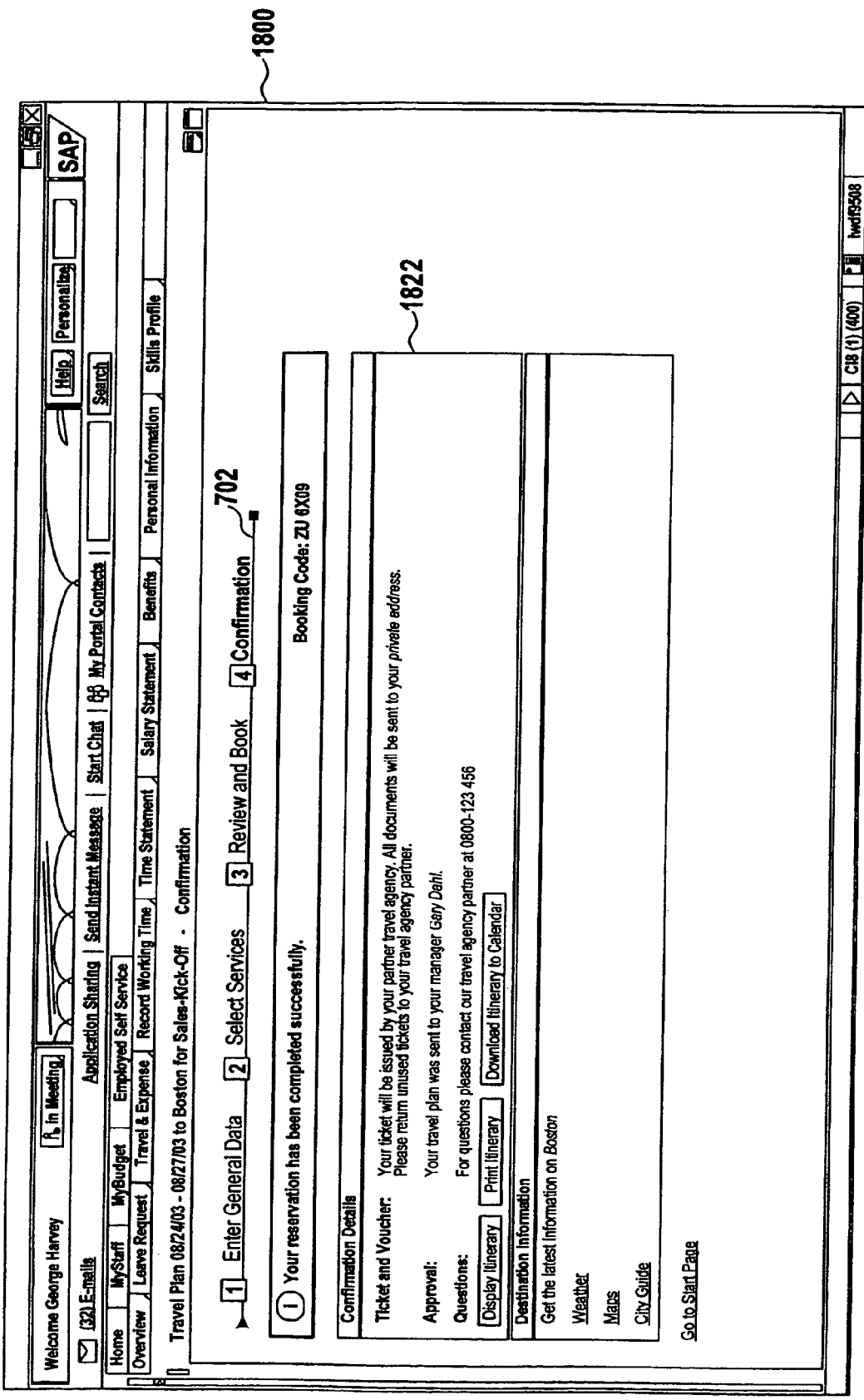
FIG. 18 shows the window when the top-level icon "confirmation" is selected.
Figure 19:
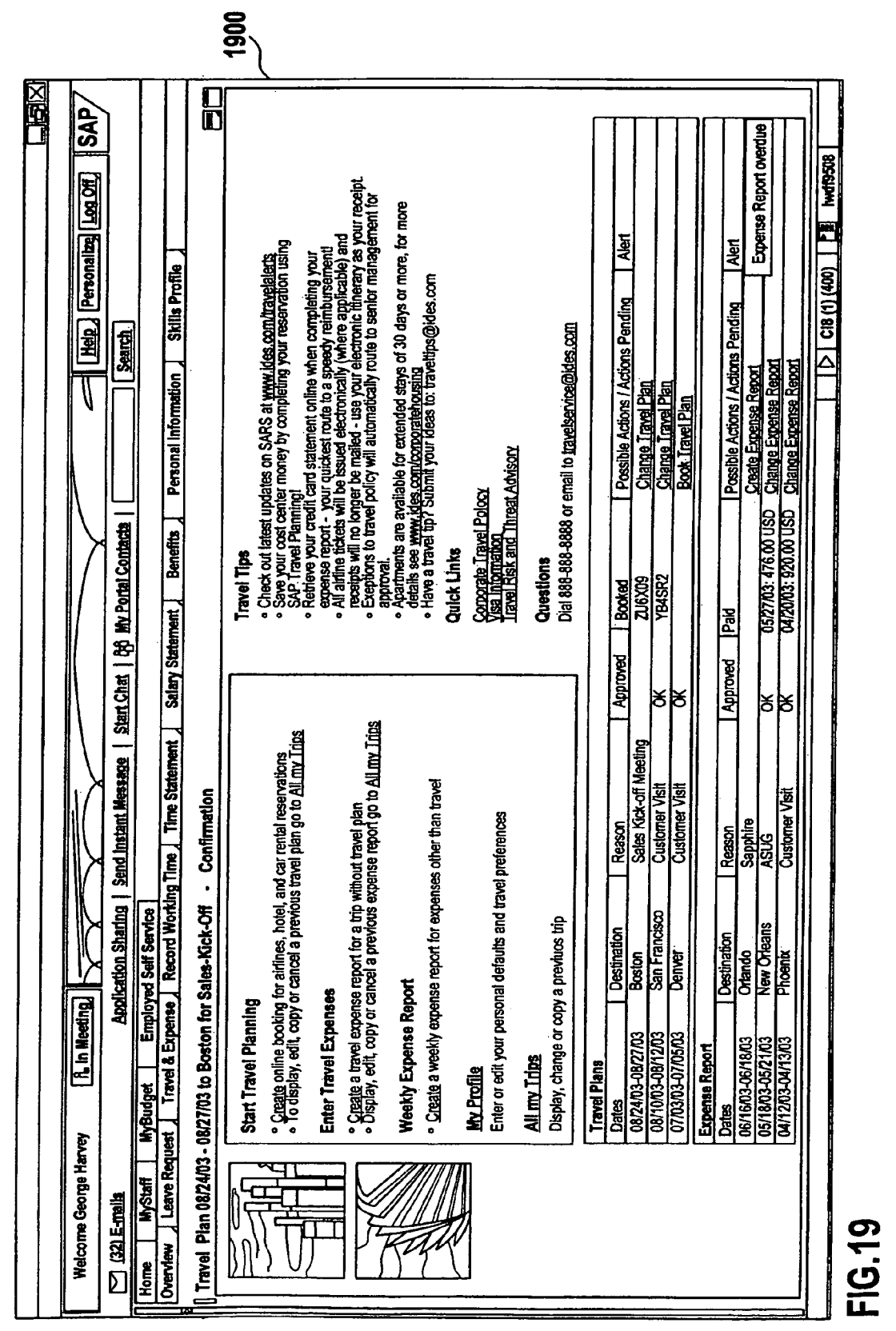

In response window 1800 is generated as shown in FIG. 18. FIG. 18 shows linear sequence 702 with the top-level icon 'confirmation' highlighted. Further confirmation information is shown in window 1822. By clicking on the hyperlink 'go to start page' window 1900 is generated as shown in FIG. 19 with the updated travel plans.

It is to be noted that while the preferred embodiment of FIGS. 6 to 19 relates to a business process, i.e. entering a travel plan, a similar procedure can be employed for entering of other kinds of data, such as for declaring a new network component in a telecommunication network, installing a new hardware component in a computer system, installing an application program and/or entering of user preferences. The present invention is particularly advantageous for all such complex data entry tasks as it intuitively guides the user through the process by means of easy to understand top-level and second-level linear sequences of icons and selection buttons depending on the context.

What is claimed is:

1. A method of entering data in a data processing system comprising:
   displaying a first linear sequence of top-level icons, wherein each icon corresponds to a data entry task;
   displaying, in response to activating a selected one of the top-level icons, an associated sub-task icon corresponding to a sub-task of the data entry task, wherein the associated sub-task icon is displayed concurrently with the first linear sequence of top-level icons on a same screen;
   displaying a second linear sequence of second-level icons and removing the associated sub-task icon in response to selecting the associated sub-task icon, wherein a leading icon of the second linear sequence is vertically aligned with the selected one of the top-level icons of the first linear sequence, and the second linear sequence of second-level icons is displayed concurrently with the first linear sequence of top-level icons on the same screen; and
   displaying at least one data entry field for a selected one of the second-level icons, wherein the at least one data entry field is displayed concurrently with the second linear sequence of second-level icons on the same screen;

displaying at least first and second selection icons for the selected one of the top-level icons of the first linear sequence, each one of the at least first and second selection icons having an assigned second linear sequence of second-level icons, and further comprising displaying of one of the second linear sequences being assigned to a selected one of the selection icons, the position of a leading icon of the selected second linear sequence being aligned with the selected one of the top-level icon;

a navigation icon for selecting a consecutive portion of top-level icons of the first linear sequence for display; and wherein a consecutive contiguous icon from the sequence of second-level icons is selected in response to completing data entry into the data entry field of a preceding icon of the second linear sequence.

2. The method of claim 1, further comprising interconnecting of the top-level icons by first horizontal lines for display of the first linear sequence and interconnecting of the second-level icons by second horizontal lines for display of the second linear sequence.

3. The method of claim 1, further comprising displaying navigation buttons for a users navigation along the first and second linear sequences.

4. The method of claim 1, further comprising discontinuing the display of the second linear sequence after the data entry operations of a corresponding sub-task has been completed.

5. The method of claim 1, further comprising highlighting of a selected one of the top-level icons and highlighting of a selected one of the displayed second-level icons, if any.

6. The method of claim 1, wherein a portion of the first linear sequence having an uneven number of top-level icons is displayed, wherein a center icon of the portion of the first linear sequence is positioned in the middle of the display window.

7. The method of claim 1, further comprising generating a mark-up language document by a server computer containing the first and second linear sequences and the data entry field, and using a request-response protocol for transmitting the mark-up language document to a client computer and for transmitting of data that has been entered into the data entry field from the client computer to the server computer.

8. A computer program product on a computer-readable storage medium for entering of data in a data processing system, the computer program product on the computer-readable storage medium comprising instructions for:

displaying a first linear sequence of top-level icons, wherein each icon corresponds to a data entry task;

displaying, in response to activating a selected one of the top-level icons, an associated sub-task icon corresponding to a sub-task of the data entry task, wherein the associated sub-task icon is displayed concurrently with the first linear sequence of top-level icons on a same screen;

displaying a second linear sequence of second-level icons and removing the associated sub-task icon in response to selecting the associated sub-task icon, wherein a leading icon of the second linear sequence is vertically aligned with the selected one of the top-level icons of the first linear sequence, and the second linear sequence of second-level icons is displayed concurrently with the first linear sequence of top-level icons on the same screen;

displaying at least one data entry field for a selected one of the second-level icons, wherein the at least one data entry field is displayed concurrently with the second linear sequence of second-level icons on the same screen;

displaying at least first and second selection icons for the selected one of the top-level icons of the first linear sequence, each one of the at least first and second selection icons having an assigned second linear sequence of second-level icons, and further comprising displaying of one of the second linear sequences being assigned to a selected one of the selection icons, the position of a leading icon of the selected second linear sequence being aligned with the selected one of the top-level icon;

a navigation icon for selecting a consecutive portion of top-level icons of the first linear sequence for display; and selecting a consecutive contiguous icon from the sequence of second-level icons after data entry into the data entry field of a preceding icon of the second-level icons has been completed.

9. The computer program product of claim 8, comprising instructions for interconnecting of the top-level icons by first horizontal lines for display of the first linear sequence and interconnecting of the second-level icons by second horizontal lines for display of the second linear sequence.

10. The computer program product of claim 8, further comprising instructions for displaying navigation buttons for a users navigation along the first and second linear sequences.

11. The computer program product of claim 8, further comprising instructions for discontinuing the display of the second linear sequence after the data entry operations of a corresponding sub-task has been completed.

12. The computer program product of claim 8, further comprising instructions for highlighting of a selected one of the top-level icons and highlighting of a selected one of the displayed second-level icons, if any.

13. The computer program product of claim 8, the instructions being adapted to generate a mark-up language document comprising the first and second linear sequences and the at least one data entry field and using a request-response protocol for transmitting the mark-up language document to a client computer and for transmitting of data that has been entered into the data entry field from the client computer to the server computer.

14. A computer system comprising means for generating a mark-up language document comprising:

a first linear sequence of top-level icons, wherein each icon corresponds to a data entry task;

a sub-task icon corresponding to a sub-task of the data entry task associated with a selected one of the top-level icons, wherein the sub-task icon is removed after being activated;

a second linear sequence of second-level icons generated in response to activating the sub-task icon, wherein the second level-icons represent sub-steps in a business process that are performed sequentially, a leading icon of the second linear sequence is vertically aligned with the selected one of the top-level icons of the first linear sequence, and the second linear sequence of second-level icons is displayed concurrently with the first linear sequence of top-level icons on the same screen;

at least one data entry field for a selected one of the second-level icons, wherein the at least one data entry field is displayed concurrently with the second linear sequence of second-level icons on the same screen;

at least first and second selection icons for the selected one of the top-level icons of the first linear sequence, each one of the at least first and second selection icons having an assigned second linear sequence of second-level icons, and further comprising one of the second linear sequences being assigned to a selected one of the selection icons, the position of a leading icon of the selected second linear sequence being aligned with the selected one of the top-level icon;

a navigation icon for selecting a consecutive portion of top-level icons of the first linear sequence for display; and wherein the mark-up language document is further configured to select a consecutive contiguous icon after data entry into the data entry field of a preceding icon of the second linear sequence has been completed.

15. The computer system of claim 14, a mark-up language document further comprising a set of navigation buttons for a users navigation along the first and second linear sequences.

16. The computer system of claim 14, the first linear sequence comprising n top-level icons of respective data entry tasks i of a selected data entry procedure, where $0<i\leqq n$, and wherein the second linear sequence comprises second-level icons for performing a selected sub-task j of task i, and wherein each one of the second-level icons represents one of m data entry steps k, where $0<k\leqq m$, of the second linear sequence.

* * * * *

UNITED STATES PATENT AND TRADEMARK OFFICE
CERTIFICATE OF CORRECTION

PATENT NO. : 7,735,022 B2  
APPLICATION NO. : 10/933263  
DATED : June 8, 2010  
INVENTOR(S) : Michael Danninger et al.

Page 1 of 1

It is certified that error appears in the above-identified patent and that said Letters Patent is hereby corrected as shown below:

At page 1 (patent face), following item (21), please insert:

-- (22)  PCT Filed:  Dec. 3, 2003

(86)  PCT No.:  PCT/EP03/13650

§371 (c)(1),  
(2), (4) Date:  Sep. 3, 2004

(87)  PCT Pub. No.:  WO04/111843

PCT Pub. Date:  Dec. 23, 2004

(65)  Prior Publication Data

US 2005/0125268 A1    June 9, 2005

Related U.S. Application Data

(60)  Provisional application No. 60/478,461, filed on June 13, 2003 --

Signed and Sealed this

Twenty-seventh Day of July, 2010

David J. Kappos  
*Director of the United States Patent and Trademark Office*